United States Patent
Johann et al.

(10) Patent No.: US 10,888,211 B2
(45) Date of Patent: Jan. 12, 2021

(54) DISHWASHING METHOD AND DISHWASHER

(71) Applicant: BWT Aktiengesellschaft, Mondsee (AT)

(72) Inventors: Juergen Johann, Nußloch (DE); Andrea Pavan, Cittadella (IT)

(73) Assignee: BWT Aktiengesellschaft, Mondsee (AT)

( * ) Notice: Subject to any disclaimer, the term of this patent is extended or adjusted under 35 U.S.C. 154(b) by 174 days.

(21) Appl. No.: 15/769,109

(22) PCT Filed: Oct. 19, 2016

(86) PCT No.: PCT/EP2016/075097
§ 371 (c)(1),
(2) Date: Apr. 18, 2018

(87) PCT Pub. No.: WO2017/067986
PCT Pub. Date: Apr. 27, 2017

(65) Prior Publication Data
US 2018/0303308 A1 Oct. 25, 2018

(30) Foreign Application Priority Data
Oct. 21, 2015 (DE) .......... 10 2015 220 582

(51) Int. Cl.
*A47L 15/42* (2006.01)
*A47L 15/00* (2006.01)
(Continued)

(52) U.S. Cl.
CPC ......... *A47L 15/424* (2013.01); *A47L 15/0015* (2013.01); *A47L 15/4229* (2013.01);
(Continued)

(58) Field of Classification Search
CPC .................................................... A47L 15/424
See application file for complete search history.

(56) References Cited

U.S. PATENT DOCUMENTS 6,458,257 B1 * 10/2002 Andrews ............... C02F 1/4672
204/262
6,474,111 B1 * 11/2002 Pattee ................. A47L 15/4291
134/111

(Continued)

FOREIGN PATENT DOCUMENTS

CN    1897861 A    1/2007
CN    101208158 A    6/2008

(Continued)

OTHER PUBLICATIONS

First Office Action dated Nov. 5, 2019, of counterpart Chinese Application No. 201680061669.9, along with an English translation.

*Primary Examiner* — Jason Y Ko
(74) *Attorney, Agent, or Firm* — DLA Piper LLP (US)

(57) ABSTRACT

A dishwashing method in which water having an oxidizing and disinfecting action is provided in a dishwasher and used as dishwashing water or added to a dishwashing water, wherein, to provide the water, a) a stream of untreated water is fed into a reverse osmosis device and separated into a concentrate stream and a permeate stream, b) ozone is produced by an ozone generator, and c) the ozone is introduced into the permeate stream emerging from the reverse osmosis device, wherein the reverse osmosis controls ozone production in that the ozone generator is configured such that ozone is only produced and mixed with the permeate stream when the reverse osmosis device is in operation.

7 Claims, 12 Drawing Sheets

(51) Int. Cl.
  *C02F 1/42* (2006.01)
  *C02F 1/44* (2006.01)
  *C02F 1/78* (2006.01)
  *B01D 61/02* (2006.01)
  *B01D 61/06* (2006.01)
  *C25B 1/13* (2006.01)
  *C02F 1/467* (2006.01)
  *C02F 103/02* (2006.01)

(52) U.S. Cl.
  CPC ........... *B01D 61/025* (2013.01); *B01D 61/06* (2013.01); *C02F 1/42* (2013.01); *C02F 1/441* (2013.01); *C02F 1/78* (2013.01); *C25B 1/13* (2013.01); *A47L 2601/08* (2013.01); *C02F 1/4672* (2013.01); *C02F 2103/02* (2013.01); *C02F 2201/782* (2013.01); *C02F 2303/10* (2013.01); *C02F 2303/22* (2013.01); *C02F 2307/12* (2013.01); *Y02W 10/30* (2015.05)

(56) References Cited

U.S. PATENT DOCUMENTS

| | | |
|---|---|---|
| 2004/0222165 A1 | 11/2004 | Michocki et al. |
| 2007/0251549 A1 | 11/2007 | Heiligenmann et al. |
| 2009/0032409 A1 | 2/2009 | Horn et al. |
| 2010/0084340 A1 | 4/2010 | Monsrud et al. |
| 2010/0132750 A1 | 6/2010 | Hildenbrand et al. |
| 2012/0291816 A1 | 11/2012 | Heiligenmann et al. |
| 2013/0193079 A1 | 8/2013 | Booth et al. |
| 2014/0325766 A1 | 11/2014 | Roetker |

FOREIGN PATENT DOCUMENTS

| | | | |
|---|---|---|---|
| DE | 10 2007 024 424 A1 | 11/2008 | |
| DE | 10 2008 024 322 A1 | 11/2009 | |
| DE | 102008024322 A1 * | 11/2009 | ......... A47L 15/0015 |
| DE | 10 2010 027 795 A1 | 10/2011 | |
| DE | 10 2010 053 051 A1 | 6/2012 | |
| WO | 2005/046420 A1 | 5/2005 | |

\* cited by examiner

DISHWASHING METHOD AND DISHWASHER

TECHNICAL FIELD

This disclosure relates to a dishwashing method and a dishwasher.

BACKGROUND

In many areas of industry and in numerous commercial areas, demineralized water is required. In power generating plants that produce steam, in baking ovens that fill the baking space with steam and in air-conditioning systems for evaporation cooling. A further application for which demineralized water is required is that of industrial dishwashers, in particular dishwashers for gastronomy. Demineralized water is used in particular to clean glasses or eating utensils. This avoids formation of deposits and marks from minerals, in particular from $CaCO_3$ (limescale), on these items.

Technically, demineralized water is usually produced by reverse osmosis. Reverse osmosis is a membrane separating method in which a stream of untreated water, often also referred to as a feed stream, is passed along a semipermeable membrane under pressure. The pressure is usually generated by a pump known as a feed pump. Some of the water penetrates through the membrane, whereas a large part of the minerals dissolved in the water are kept back by the membrane. The water demineralized by reverse osmosis is referred to as permeate. The residual water containing minerals is referred to as concentrate.

Reverse osmosis generally produces water with an electrical conductivity of 5 μS/cm to 50 μS/cm. Depending on the type of membrane used and depending on the parameters (pressure, temperature) under which the method is carried out, water that is more or less mineral-free is obtained.

Even when demineralized water is used, odors often occur in dishwashers. In some cases, even freshly washed glasses, in particular water or wine glasses, smell unpleasant. The reason for this is usually microbial bacteria, which in dishwashers find conditions conducive for growth.

There is therefore a need to address these problems.

SUMMARY

We provide a dishwashing method in which water having an oxidizing and disinfecting action is provided in a dishwasher and used as dishwashing water or added to a dishwashing water, wherein, to provide the water, a) a stream of untreated water is fed into a reverse osmosis device and separated into a concentrate stream and a permeate stream, b) ozone is produced by an ozone generator, and c) the ozone is introduced into the permeate stream emerging from the reverse osmosis device, wherein the reverse osmosis controls ozone production in that the ozone generator is configured such that ozone is only produced and mixed with the permeate stream when the reverse osmosis device is in operation.

We also provide a dishwasher including a device that provides water having an oxidizing and disinfecting action, including a) a reverse osmosis device in which a stream of untreated water is separated into a concentrate stream and a permeate stream, b) a line for the permeate stream, and c) an ozone generator for production of oxygen, wherein the ozone generator is arranged within the line or coupled to the line such that, when the ozone generator is in operation, the ozone can be introduced into the permeate stream, and the ozone generator is coupled in terms of energy to the reverse osmosis device such that the energy for its operation is obtained during operation of the reverse osmosis device.

DETAILED DESCRIPTION

Figure 1:
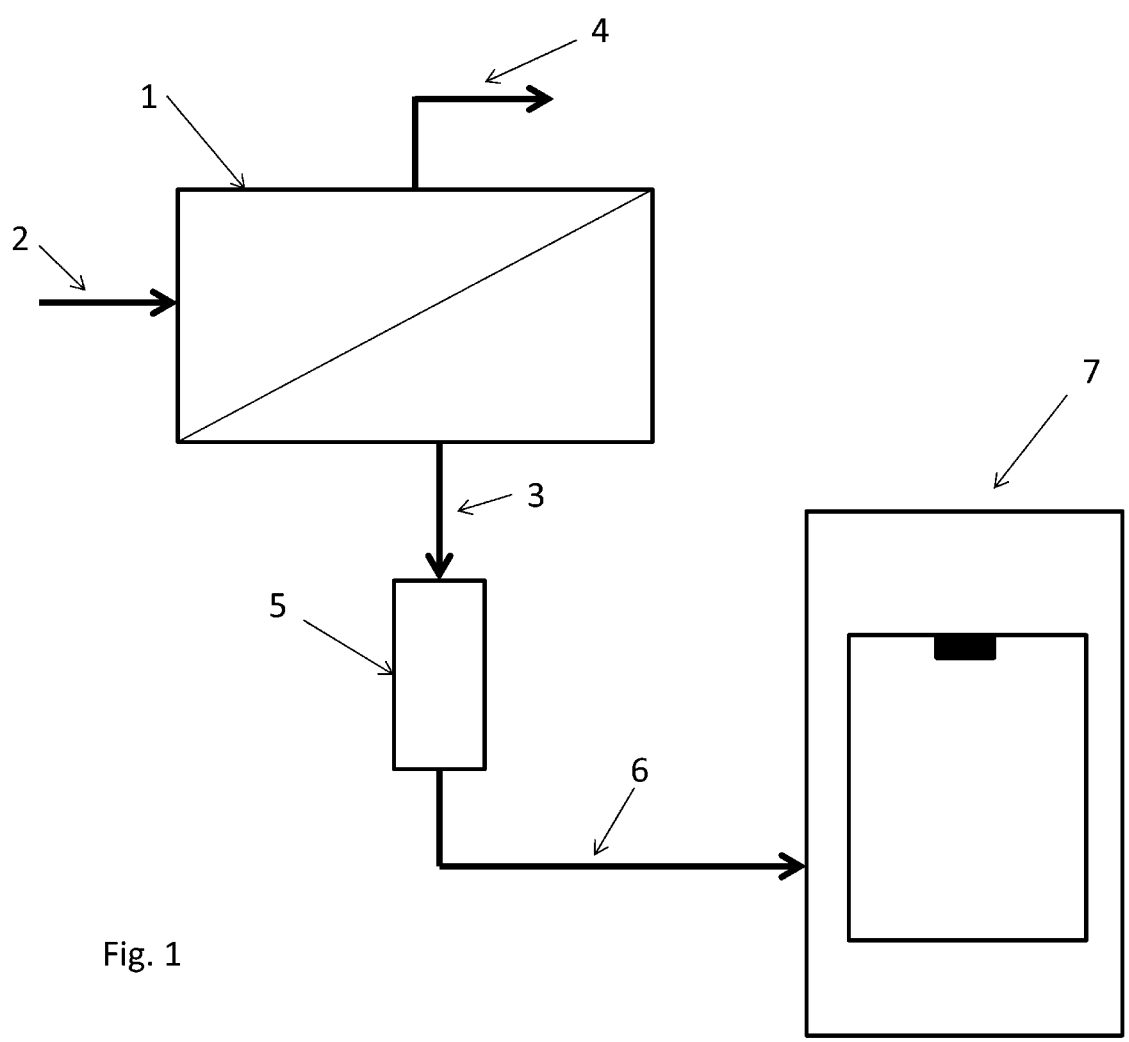
FIG. 1 schematically shows an example of a reverse osmosis device with a stream of untreated water, a concentrate stream and a permeate stream.

In our dishwashing method, water that has an oxidizing and disinfecting action is provided in a dishwasher and used as a dishwashing water or added to a dishwashing water.

To provide the water with the oxidizing and disinfecting action, a stream of untreated water is fed into a reverse osmosis device and is separated into a comparatively high-mineral concentrate stream and a comparatively low-mineral permeate stream. For this purpose, ozone is produced (preferably in a simultaneous process) by an ozone generator. The ozone is introduced into the permeate stream emerging from the reverse osmosis device. In short, the permeate of a reverse osmosis is ozonized, that is to say mixed with ozone. The ozonized permeate stream is then either used directly as dishwashing water or added to a dishwashing water.

The ozonized permeate thus provided is not only suitable for use in dishwashers. It can in principle be used everywhere where a disinfecting or oxidizing action is needed.

The operating principle of a reverse osmosis device was briefly described at the beginning and is known. It does not have to be explained any more specifically within the scope of this disclosure. It should merely be briefly mentioned at this point that, in the reverse osmosis device used in our method, the stream of untreated water is passed along a semipermeable membrane under pressure by a feed pump.

The permeate from a reverse osmosis device is very well suited for ozone generation since there is virtually no ozone depletion in the permeate caused by other constituents of the water such as, for example, organic substances (TOC). The ozone concentration remains stable for a long time and is not used up.

Preferably, the method is distinguished by at least one of the following features:

1) Introduction of the ozone into the permeate stream is coupled to operation of the reverse osmosis device. This should be understood as meaning that the permeate stream is always and only ever mixed with ozone when the reverse osmosis device is in operation. This is ensured in particular whenever the ozone generator can only produce ozone in dependence on the operating state of the reverse osmosis device. In other words: the reverse osmosis controls the ozone production.

2) The ozone generator is operated with electrical energy obtained during operation of the reverse osmosis device. This is inter alia preferred according to 1). The feature may however also be implemented independently of 1).

3) The electrical energy is obtained by a power generator driven by the flow of the stream of untreated water and/or the permeate stream and/or the concentrate stream. This is inter alia preferred according to 2). The feature may however also be implemented independently of 2).

Since the power generator only generates electrical energy when there is a flow, ozone generation is indirectly controlled by the feed pump of the reverse osmosis device.

4) Ozone from the ozone generator is introduced into the permeate stream by a suction device driven by the flow of the permeate stream. This is inter alia preferred according to 1). The feature may however also be implemented independently of 1).

5) Ozone from the ozone generator is introduced into the permeate stream by a pumping device operated by energy, in particular electrical energy obtained during operation of the reverse osmosis device. This is inter alia according to 1). The feature may however also be implemented independently of 1).

The ozone generator may be an ozone generator that operates on the principle of silent electric discharge. Preferably, the ozone generator may however also be an electrolytic ozone generator, that is to say an ozone generator having an electrolytic cell with an anode and a cathode. Both procedures for generating ozone are known.

In ozone generation by "silent electric discharge," ozone is generated from pure oxygen or atmospheric oxygen with the aid of a high-voltage alternating field and the associated impact ionization. For this purpose, a dielectric, for example, glass or ceramic is arranged between two electrodes. A high voltage of frequently several kV is applied to the two electrodes. Air flows between the electrode and the dielectric. When the high voltage is applied, a plasma in which ozone is formed is produced on the surface of the dielectric.

This type of ozone generation has proven to be particularly cost-effective. The ozone-containing gas produced (an ozone-oxygen mixture or an ozone-air mixture) must subsequently be introduced into the permeate stream.

In ozone generation by an electrolytic cell, a voltage sufficiently high to allow formation of free oxygen atoms by water electrolysis is applied between two electrodes kept in water (the anode and the cathode). Ozone generation takes place in situ. This method is preferred in particular whenever the water to be ozonized has an electrical conductivity of no more than 40 μS/cm, preferably of no more than 20 μS/cm.

The permeate used in our method preferably has an electrical conductivity of 5 μS/cm to 50 μS/cm, preferably 5 μS/cm to 40 μS/cm, in particular 5 μS/cm to 20 μS/cm. When the electrolytic cell is used, the permeate is passed through the electrolytic cell, in which the ozone is generated and at the same time is introduced into the permeate.

In electrolytic ozone generation, ozone is generated directly at the anode and dissolved in the water. Absorption of ozone in the permeate is very good in this case since the ozone is formed directly in the water by the water splitting and generation of free oxygen atoms.

An ozone generator in which ozone is generated by UV radiation may also be used. However, such generators have a comparatively high energy consumption.

If the ozone generator is an electrolytic ozone generator, the following constructions are particularly preferred:

For the purpose of removing hardness, the permeate stream is treated with the aid of an ion exchanger before it is passed into the ozone generator.

In the presence of hardness, calcium and magnesium in the permeate, even in very low concentrations, deposits that increase the electrical resistance of the electrolytic cell occur on the cathode of the electrolytic cell. This may make ozone production more difficult or even prevent it. Formation of deposits can be counteracted by reversing the polarity of the cell from time to time, with suitable time intervals being, for example, a few minutes. However, another much more efficient measure is the use of an ion exchanger.

Particularly efficient ozone generation has been observed when using an ion exchanger of the H+ form. The ion exchanger may be a strongly acidic or weakly acidic ion exchanger.

Arranged between the anode and the cathode is an ion exchange membrane by which the electrolytic cell is subdivided into an anode region with the anode and a cathode region with the cathode.

The comparatively low electrical conductivity of the permeate of 5 μS/cm to 50 μS/cm leads to a relatively high electrical resistance in the electrolytic cell. To reduce this resistance, the ion exchange membrane may be arranged in the electrolytic cell between the anode and the cathode. Preferably used here is a membrane that selectively allows cations to pass, in particular a membrane with a polymer framework of polytetrafluoroethylene modified with sulfonate or carboxylate groups, for example, the polymer membrane from the DuPont company known by the trade name Nafion®.

Both the anode region and the cathode region are fed with permeate from the reverse osmosis device, it being possible for the ratio in which the permeate stream is distributed between the anode region and the cathode region to be controlled by an adjusting means.

In this example, the permeate stream is divided before it is fed into the electrolytic cell. One part of the permeate stream is fed into the anode region, the other into the cathode region. The adjusting means may be, for example, a multiway valve.

Only the permeate emerging from the anode region (the anolyte) is passed on for further use; the permeate emerging from the cathode region (the catholyte) is discarded.

In the electrolysis, hydrogen is generated at the cathode. To prevent the hydrogen from getting into a downstream dishwasher, for example, the hydrogen-laden catholyte is discarded.

The ion exchange membrane arranged in the electrolytic cell has apertures through which permeate can pass from the cathode region into the anode region and vice versa. With this design it is possible that the catholyte passes through the apertures in the ion exchange membrane into the anode region.

Only the anode region is fed with permeate from the reverse osmosis device, and permeate is only removed from the cathode region, or only the cathode region is fed with permeate from the reverse osmosis device, and permeate is only removed from the anode region.

In this example, the permeate stream is first fed either into the anode region or into the cathode region. As a result of the apertures in the ion exchange membrane, in the next step it passes either from the anode region into the cathode region or from the cathode region into the anode region. From there, it is then removed and passed on for its further use.

If the ozone generator is an ozone generator that operates on the principle of silent electric discharge, the following constructions are particularly preferred:

The ozone/air mixture is introduced into the permeate stream by the suction device. The suction device may be, for example, a jet pump in which the permeate is used as the driving medium.

The ozone/air mixture is introduced into the permeate stream by a pumping device, in particular with the aforementioned pumping device.

The ozone generator is fed with air from which air moisture has been removed by a desiccant. Blue gel, silica gel or a molecular sieve may be used, for example, as the desiccant.

The permeate treated with ozone may be used in the dishwasher both to clean and rinse dishware. The ozonized permeate has a biocidal and virucidal action and consequently kills bacteria and viruses on the items to be washed. In this way, it prevents the occurrence of odors. The method makes washed glasses smell neutral, eliminating all of the unpleasant odors in wine and water glasses, for example.

A dishwashing and/or rinsing operation with the ozonized permeate is preferably performed at temperatures of at most 50° C., preferably of at most 40° C. The dishwashing and/or rinsing operation is preferably performed at a temperature of >15° C. and ≤50° C., particularly preferably at a temperature of >15° C. and ≤40° C. In spite of these low temperatures, hygienically satisfactory dishwashing results are achieved thanks to the ozonized permeate. As a consequence of this low-temperature operation, energy consumption of a dishwasher operated by our method is reduced.

Preferably, our method comprises at least one dishwashing and/or rinsing operation with dishwashing water containing ozonized permeate or consists of ozonized permeate and is at a temperature in one of the temperature ranges mentioned, in particular a temperature of >15° C. and ≤40° C. The method need not comprise a dishwashing and/or rinsing operation with dishwashing water that is at a temperature of >50° C. More preferably, the method does not comprise a dishwashing and/or rinsing operation with dishwashing water that is at a temperature of >40° C.

Our dishwasher is distinguished by the fact that it has a device that provides water having an oxidizing and disinfecting action. It should be understood as meaning in particular that such a device is integrated in the dishwasher or that the dishwasher is coupled to such a device such that the water with the oxidizing and disinfecting action can be provided in the dishwasher. The dishwasher in particular carries out the method.

In accordance with the above, the device providing the water with the oxidizing and disinfecting action always comprises:
  a reverse osmosis device in which a stream of untreated water is separated into a concentrate stream and a permeate stream,
  a line for the permeate stream, and
  an ozone generator for the production of ozone.

The ozone generator is in this case arranged within the line or coupled to the line such that, when the ozone generator is in operation, the ozone can be introduced into the permeate stream. The ozone generator is preferably coupled in terms of energy to the reverse osmosis device such that the energy for its operation is obtained during operation of the reverse osmosis device.

Particularly preferably, the device providing the water with the oxidizing and disinfecting action comprises:
  a power generator driven by the flow of the stream of untreated water and/or the permeate stream and/or the concentrate stream, or
  a suction device driven by the flow of the permeate stream, or
  a pumping device operated with energy, in particular electrical energy, obtained during operation of the reverse osmosis device.

As far as preferred examples of the ozone generator used and the suction device used are concerned, reference can be made to the corresponding parts of the description of the method.

Particularly preferably, the electrolytic ozone generator is integrated in the line for the permeate stream and comprises an electrolytic cell with an anode and a cathode, between which a voltage that is sufficiently high for ozone to form at the anode can be applied.

The device providing the water with the oxidizing and disinfecting action may comprise an ion exchanger by which the permeate stream can be treated for the purpose of removing hardness before the ozone is introduced into the permeate stream.

In examples in which the ozone generator is an electrolytic ozone generator, the following designs of the device are preferred, possibly also in combination with one another:
  Arranged between the anode and the cathode of the electrolytic ozone generator is an ion exchange membrane by which the electrolytic cell is subdivided into an anode region with the anode and a cathode region with the cathode.
  The device comprises an adjusting means that can be used to control in which ratio the anode region and the cathode region are fed with permeate from the reverse osmosis device.
  The ion exchange membrane arranged in the electrolytic cell has apertures through which permeate can pass from the cathode region into the anode region and vice versa.
  The electrolytic cell has an inflow for permeate into the anode region and connects to the line for the permeate stream, and also an outflow out of the cathode region and can be used to discharge the ozonized permeate from the electrolytic cell.
  The electrolytic cell has an inflow for permeate into the cathode region and connects to the line for the permeate stream, and also an outflow out of the anode region and be used to discharge the ozonized permeate from the electrolytic cell.

In examples in which the ozone generator is an ozone generator operating on the principle of silent electric discharge, the suction device is generally coupled to the ozone generator such that an ozone/air or ozone/oxygen mixture formed in the generator can be introduced into the permeate stream.

Preferably, the dishwasher is distinguished by a dishwashing program that has at least one dishwashing and/or rinsing operation with dishwashing water containing ozonized permeate or consists of ozonized permeate and is at a temperature of up to 50° C. or up to 40° C., in particular a temperature of >15° C. and ≤50° C. or a temperature of >15° C. and ≤40° C. The dishwashing program need not comprise a dishwashing and/or rinsing operation with dishwashing water at a temperature of >50° C. The dishwashing program also need not comprise a dishwashing and/or rinsing operation with dishwashing water that is at a temperature of >40° C.

The device for providing the water with the oxidizing and disinfecting action can not only be combined with a dishwasher. Air humidifiers or evaporation coolers may also comprise the device. In the two last-mentioned examples, there is deliberate evaporation of water, in one case to increase the atmospheric humidity and in the other to bring about a cooling effect. The ozonized permeate may form the water to be evaporated or be added to it.

The use of the device in an evaporation cooler or in an air humidifier counteracts microbial contamination of these devices.

Further features and advantages emerge from the following description of the drawings. The examples described below merely serve for purposes of explanation and better understanding and are not to be understood as in any way restrictive.

FIG. 1 shows a reverse osmosis device 1 with a stream of untreated water 2, a concentrate stream 4 and a permeate stream 3. The permeate stream 3 is enriched with ozone by an ozone generator 5 and introduced into the dishwasher 7 by way of the line 6.

Figure 2:
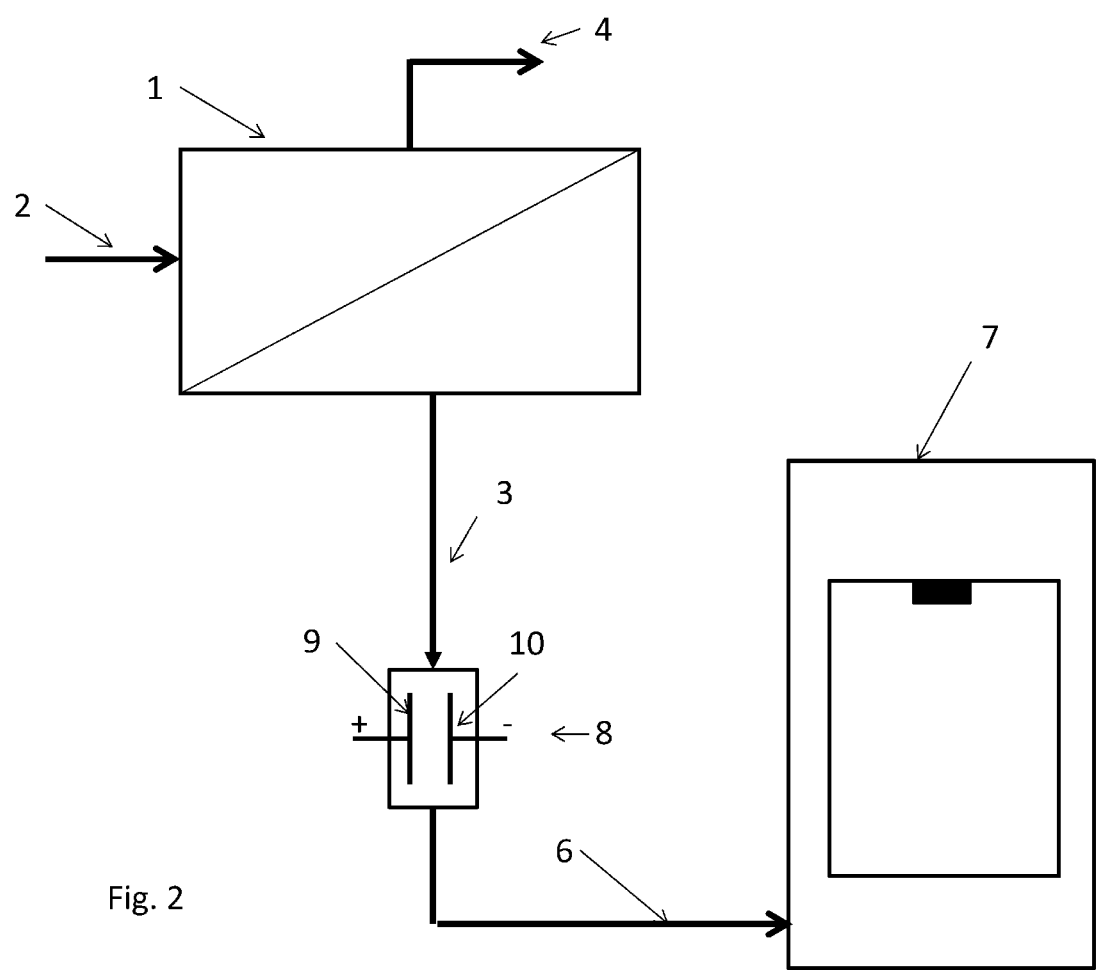
FIG. 2 schematically shows an example of an arrangement with an electrolytic ozone generator.

FIG. 2 shows an arrangement with an electrolytic ozone generator. The permeate 3 is passed through the one electrolytic device with two electrodes 9 and 10, ozone being generated at the anode 9 and dissolved directly in the permeate.

Figure 3:
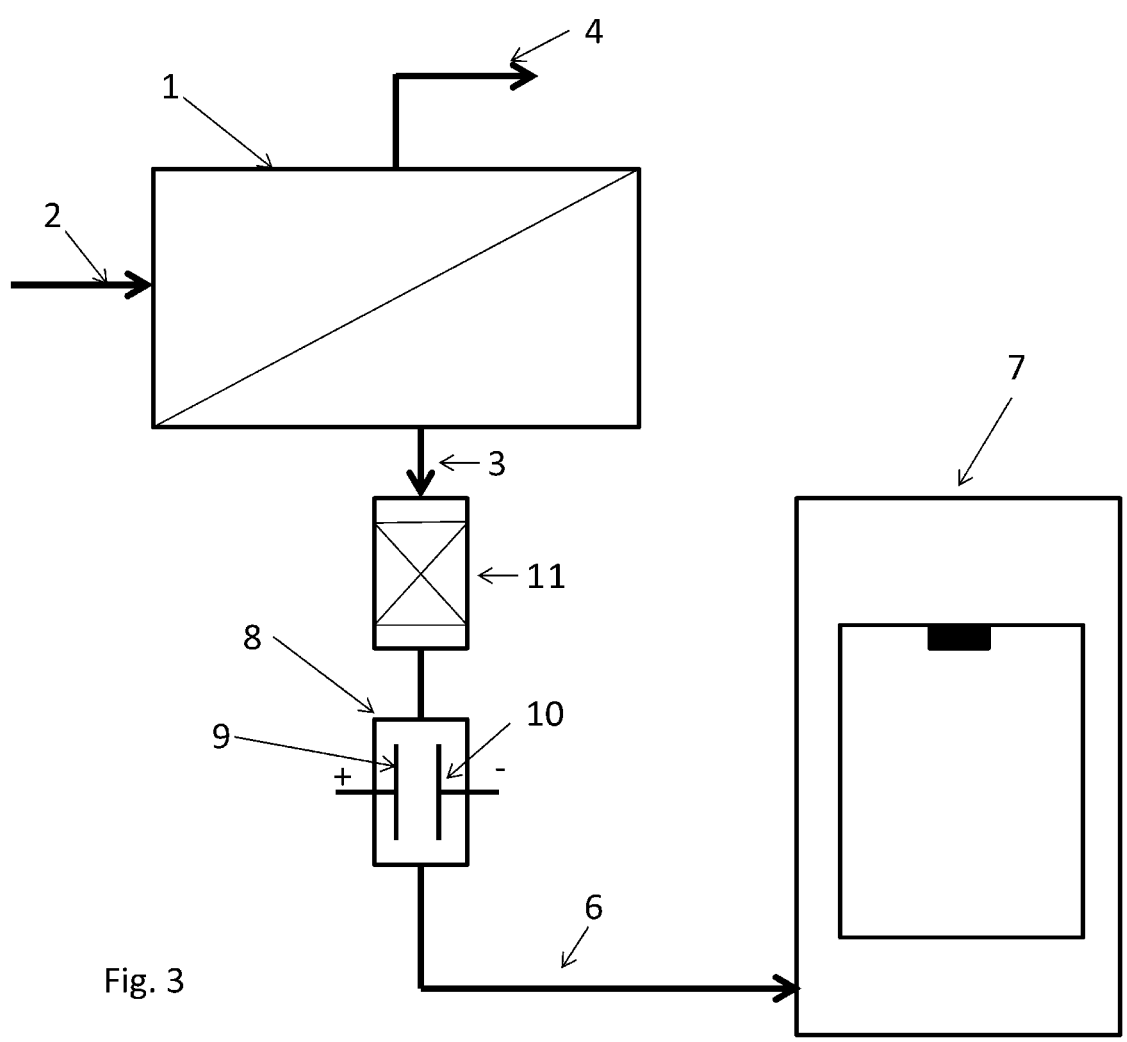
FIG. 3 schematically shows an example of a device providing water with an oxidizing and disinfecting action comprising an ion exchanger upstream of the electrolyzing device.

FIG. 3 shows an example of a device providing water with an oxidizing and disinfecting action comprising an ion exchanger 11 upstream of the electrolyzing device 8. The ion exchanger 11 may be, for example, a mixed-bed filter or a filter with a strongly acidic ion exchanger in the form of sodium or potassium. It serves the purpose of softening the permeate.

Figure 4:
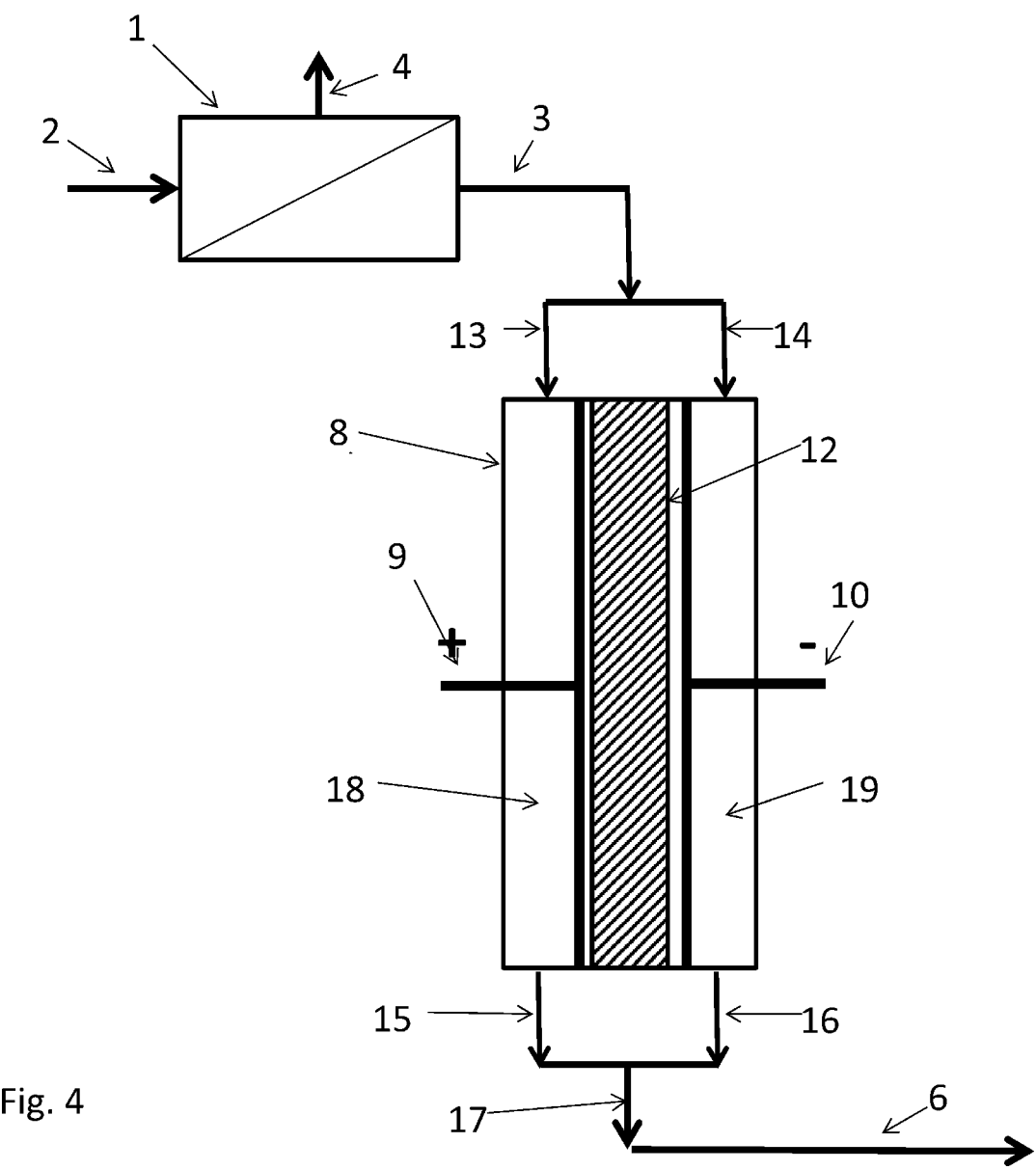
FIG. 4 schematically shows an example of an electrolyzing device with an ion exchange membrane arranged between the anode and the cathode.

FIG. 4 shows an electrolyzing device 8 with an ion exchange membrane 12 arranged between the anode 9 and the cathode 10. The permeate stream 3 is divided between an anode region inflow 13 to the anode region 18 and a cathode region inflow 14 into the cathode region 19. In the anode region 18, ozone is produced at the anode 9 and leaves the anode region with the anolyte 15. The catholyte 16 is mixed with the anolyte 15 in the line 17. The line 17 connects to the inflow line 6 to the dishwasher.

Figure 5:
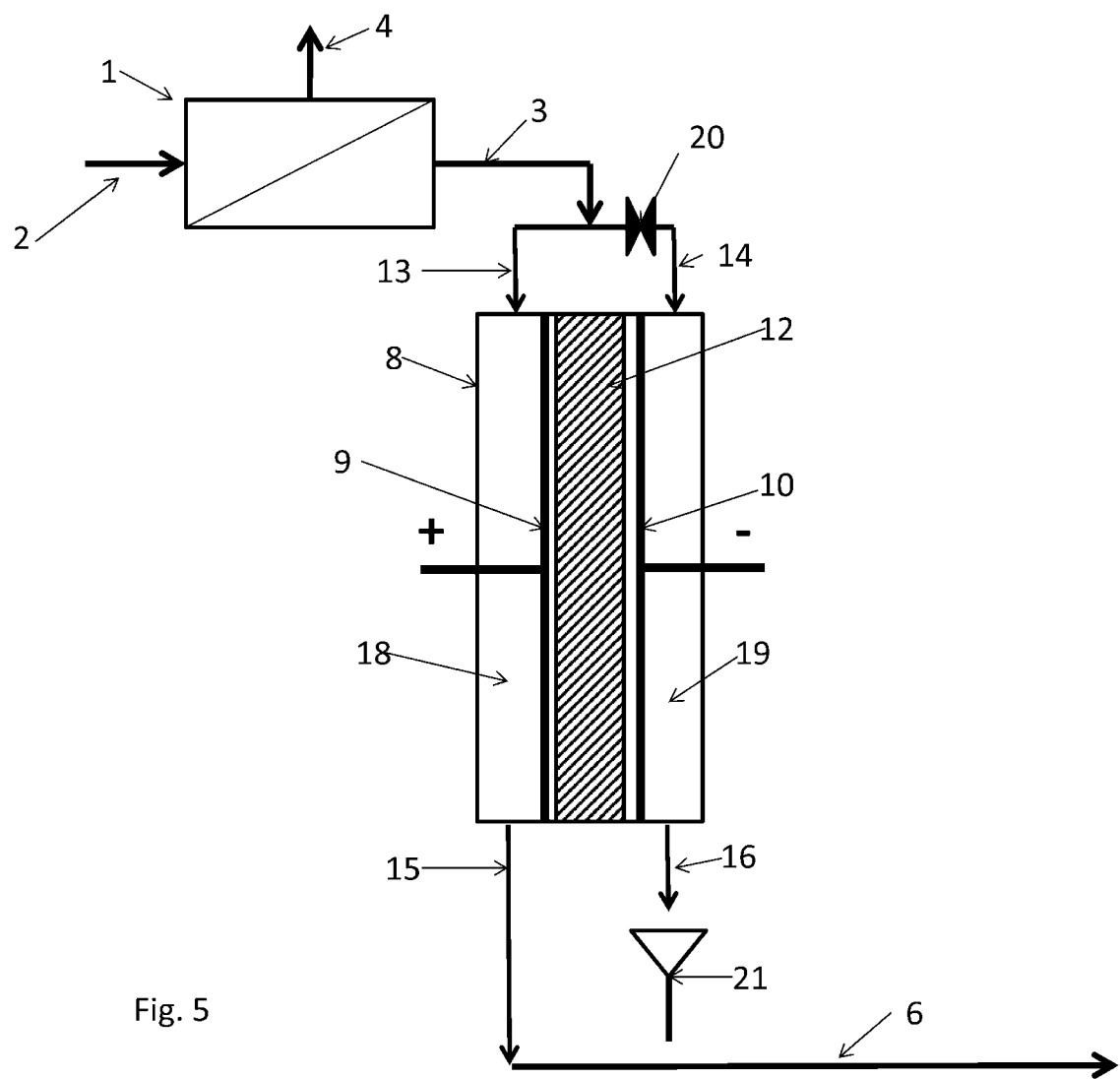
FIG. 5 schematically shows the catholyte introduced into the device of FIG. 4.

In FIG. 5, the catholyte 16 is introduced into the device 21. The volumetric flow of the catholyte 16 is set with the aid of the adjusting device 20. The anolyte 15 emerging from the cathode region 18 connects to the inflow 6 to the dishwasher. As a result, only ozonized permeate enters the dishwasher 7.

Figure 6:
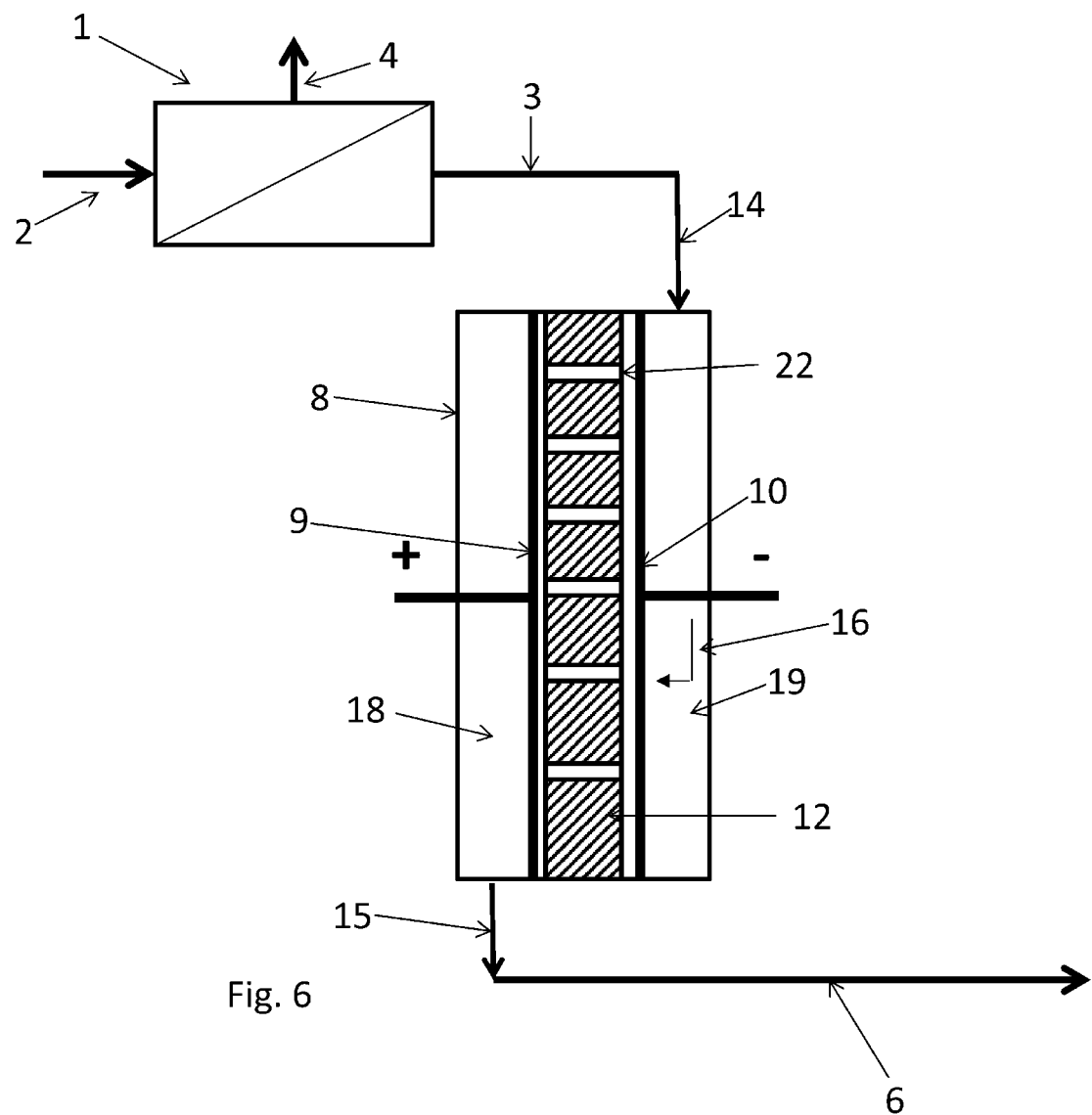
FIG. 6 schematically shows another example of the electrolyzing device.

A special example of the electrolyzing device is shown by FIG. 6. The ion exchange membrane 12 arranged between the anode 9 and the cathode 10 is provided with apertures 22.

This makes it possible for the catholyte 16 to pass through the apertures 22 of the ion exchange membrane 12 into the anode region 18. Ozone is generated at the anode 9; the anolyte 15 leaves the anode region 18. The anolyte 15 flows into the inflow line 6 to the dishwasher.

Figure 7:
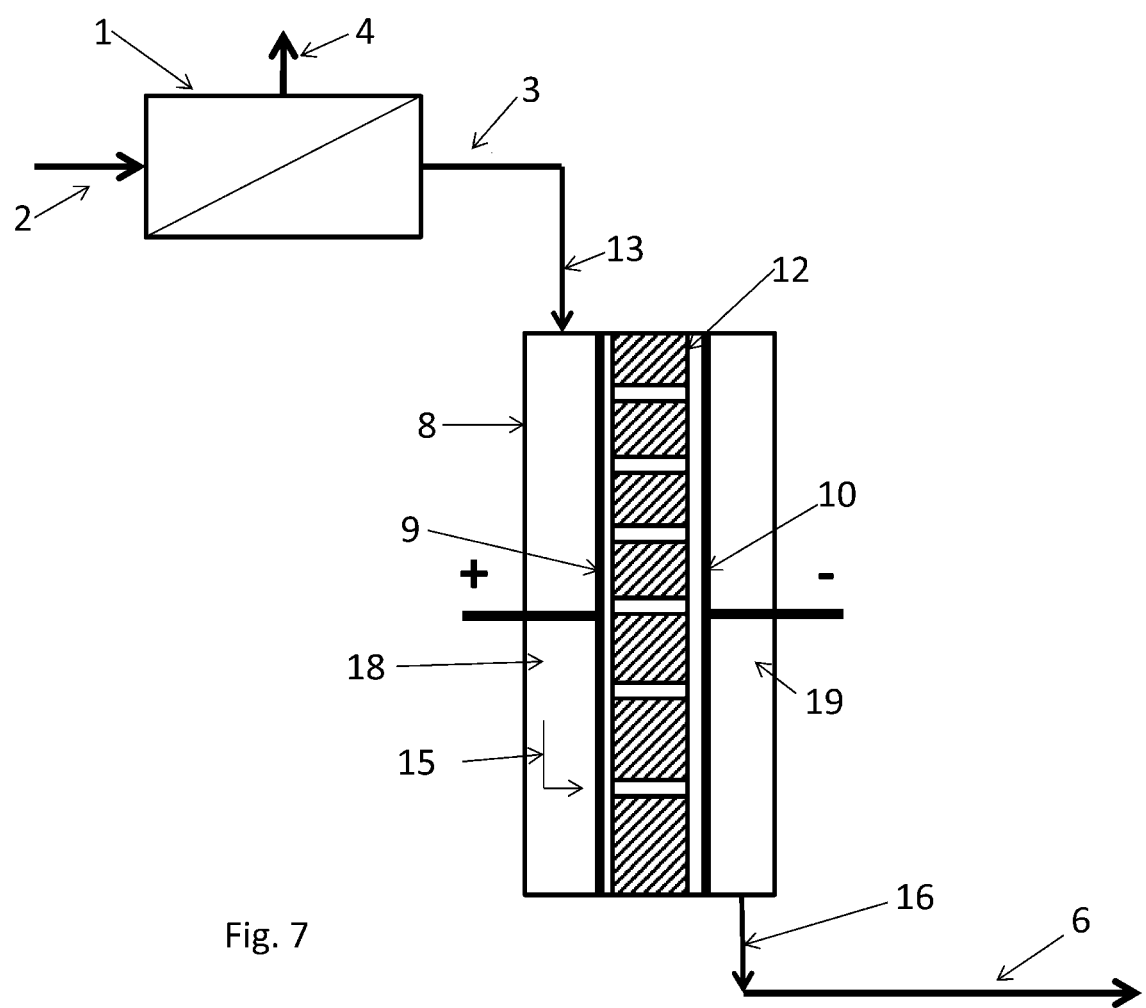
FIG. 7 schematically shows an example of an arrangement where the permeate flows through the inflow into the anode region.

Furthermore, it is also possible that the permeate 3 flows through the inflow 13 into the anode region 18. Ozone is generated at the anode 9 and the anolyte 15 flows through the apertures 22 of the ion exchange membrane 12 into the cathode region 19. The catholyte enriched with ozone flows by way of the line 16 to the inflow 6 to the dishwasher 7. This arrangement is shown in FIG. 7.

Figure 8:
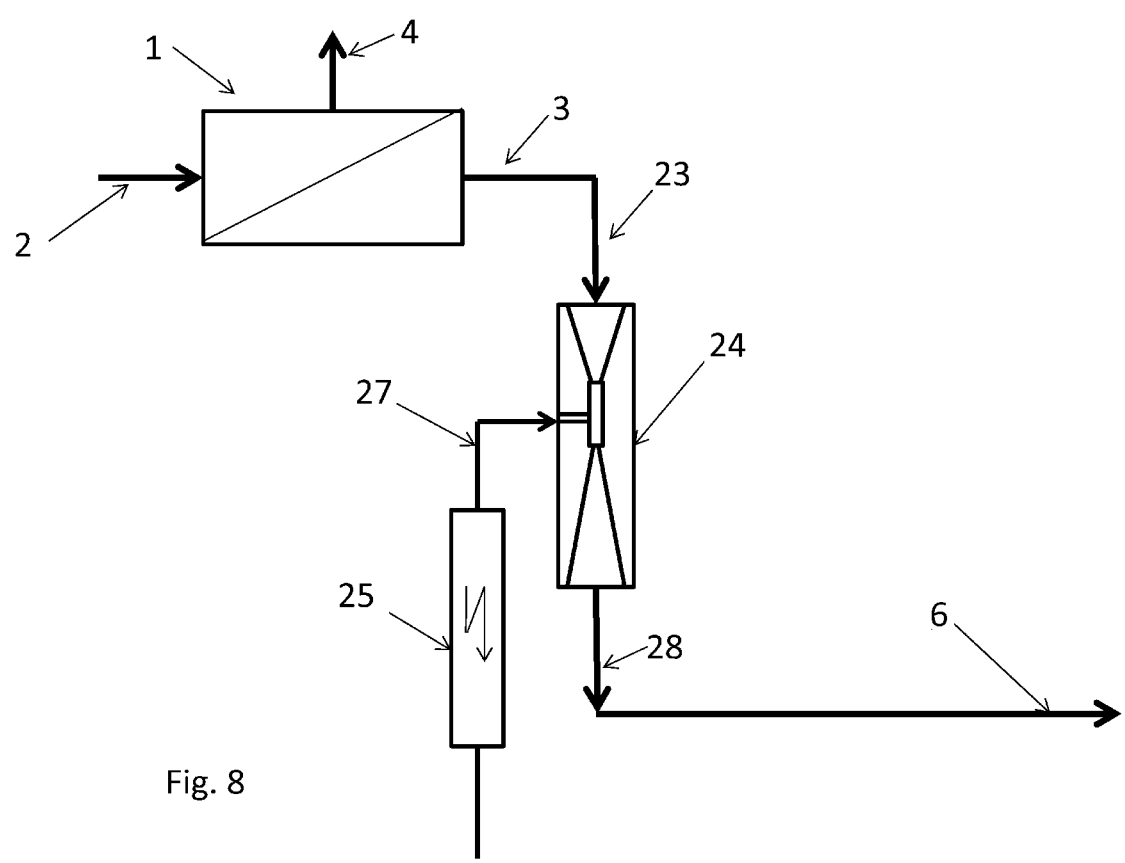
FIG. 8 schematically shows an example where the ozone generation is carried out by silent discharge.

In the example represented in FIG. 8, the ozone generation is carried out by silent discharge. With the silent discharge, a dielectric, for example, glass or ceramic is arranged between two electrodes. The air/ozone mixture produced during the discharge may be sucked in by an injector 24, FIG. 8. Ozone is generated in the ozone generator 25 and sucked in by the injector 24 by way of the line 27. The driving flow of the injector is the permeate 3 of the reverse osmosis device 1. The outflow 28 of the injector 24 is enriched with ozone and flows into the inflow line 6 of the dishwasher 7.

Figure 9:
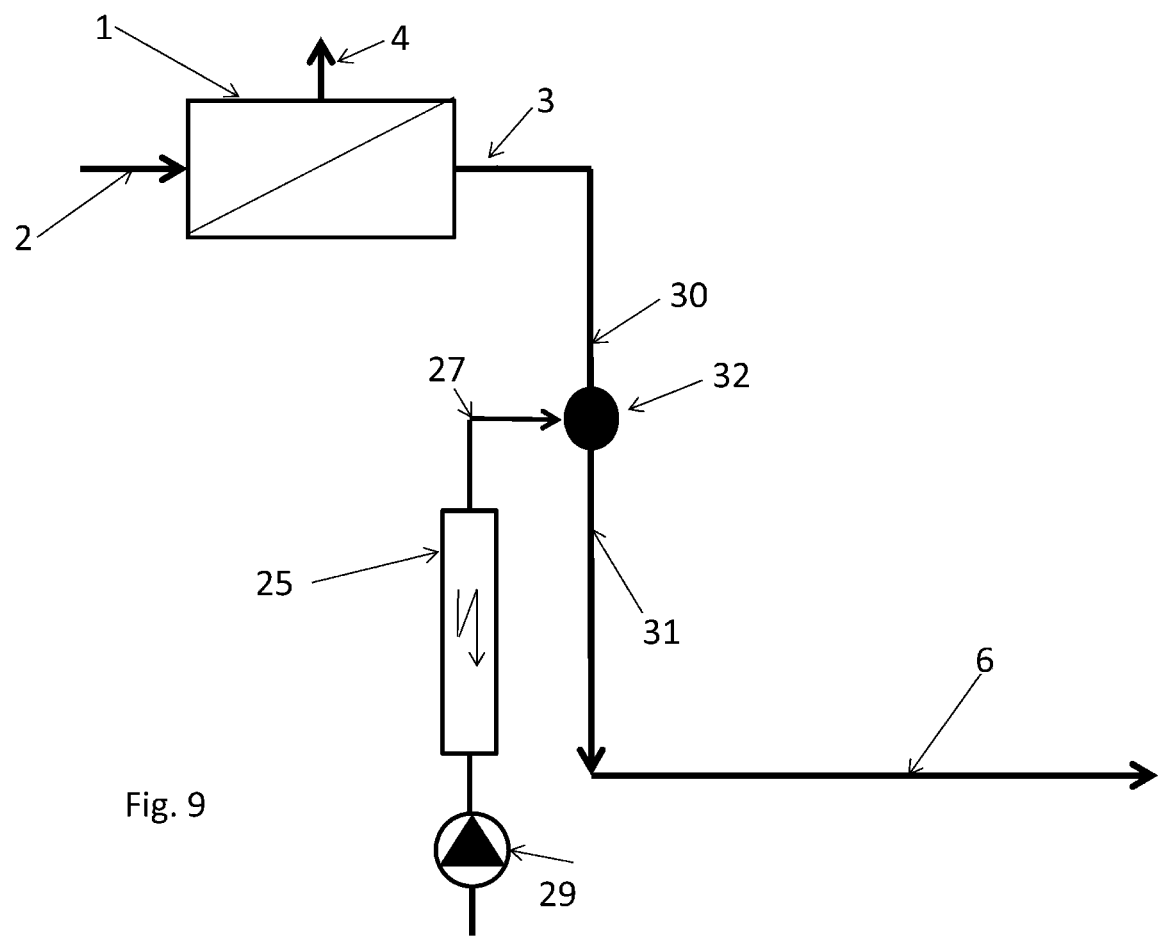
FIG. 9 schematically shows the device providing water with an oxidizing and disinfecting action with a mixing zone.

Instead of the injector 24, a mixing zone 32 may also be provided. A corresponding example of the device providing water with an oxidizing and disinfecting action is represented in FIG. 9. Air is sent by a pump 29 through the ozone generator 25, in which it is enriched with ozone, and fed by way of the line 27 to the mixing zone 32. In the mixing zone 32, the permeate 3 introduced into the mixing zone 32 by way of the line 30 is mixed with the ozone. The permeate 31 enriched with ozone is introduced into the inflow line 6 of the dishwasher 7.

Figure 10:
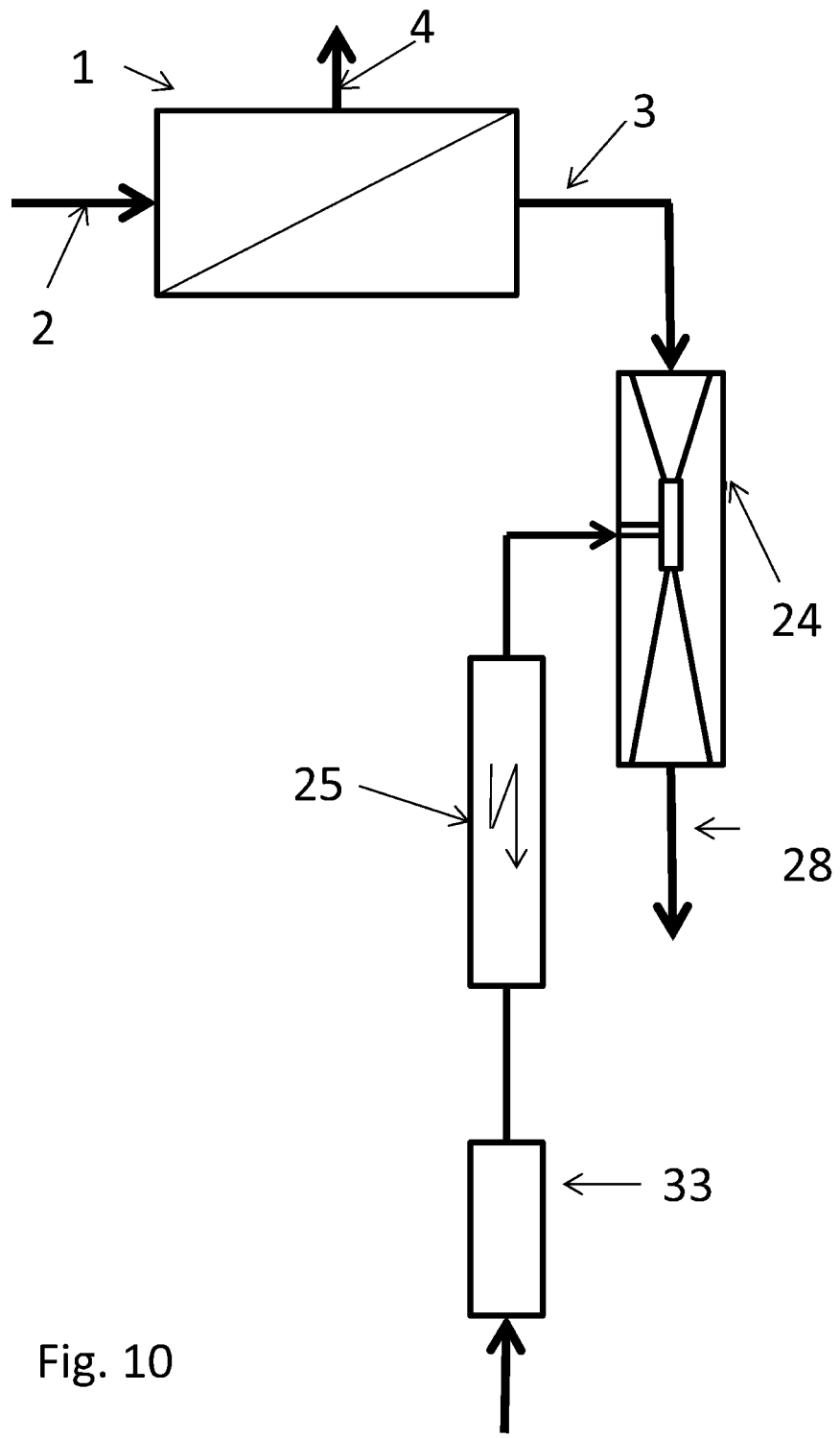
FIG. 10 schematically shows ozone production in the ozone generator, the air may be dried by an air dryer before entering the ozone generator.

To increase ozone production in the ozone generator, the air may be dried by an air dryer 33 before entering the ozone generator. The air dryer may be filled with a desiccant, for example, a molecular sieve, silica gel or else blue gel as shown in FIG. 10.

Figure 11:
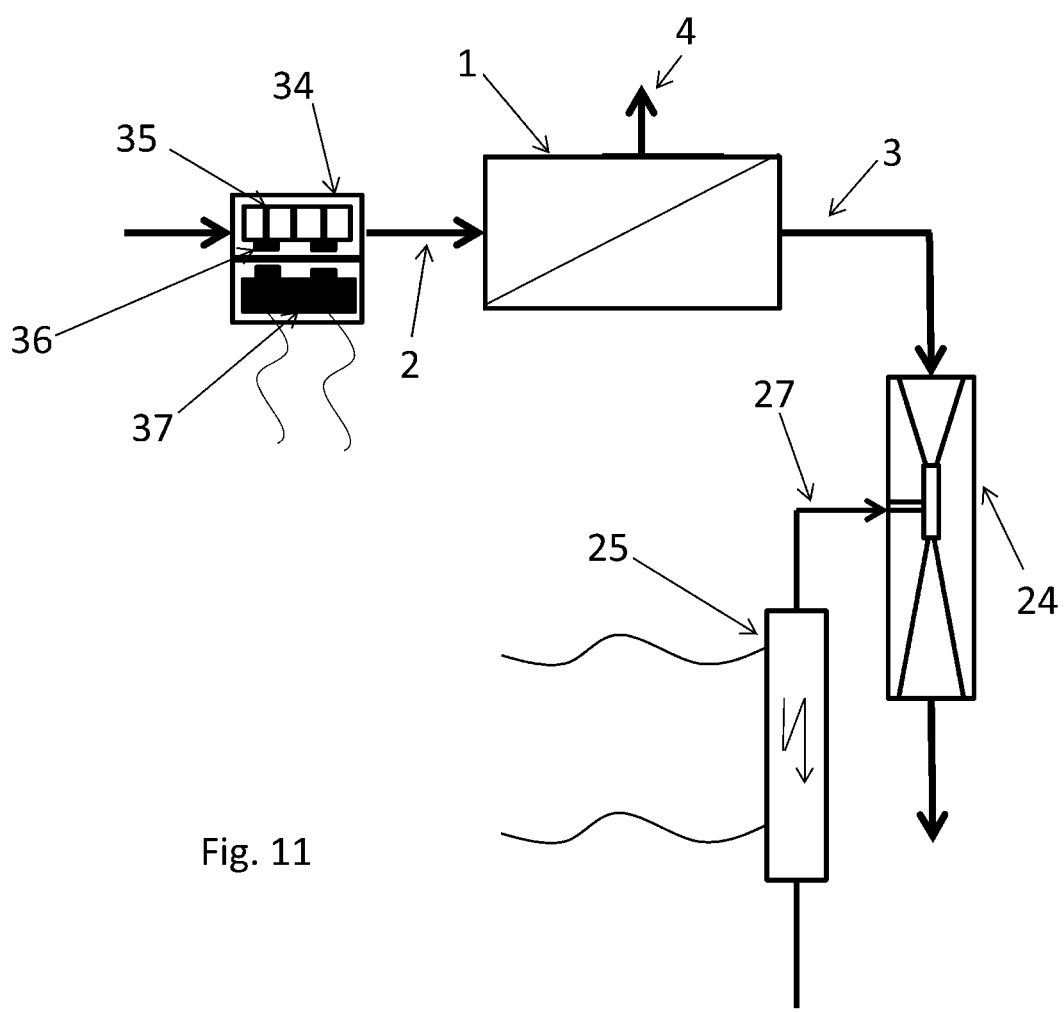
FIG. 11 schematically shows a power generator consisting of a turbine and a generator to generate the necessary electrical energy for the silent discharge.

To generate the necessary electrical energy for the silent discharge, a power generator 34 may be installed in the inflow of the reverse osmosis as shown in FIG. 11. The power generator consists of a turbine 35 and a generator 37. The turbine and the power generator are spatially separate, i.e., the drive unit consists of a magnetic coupling 36, by which water is prevented from entering the power generator 37. The enthalpy of the stream of untreated water drives the power generator 34, which generates sufficient energy to produce the ozone concentration for the permeate.

Figure 12:
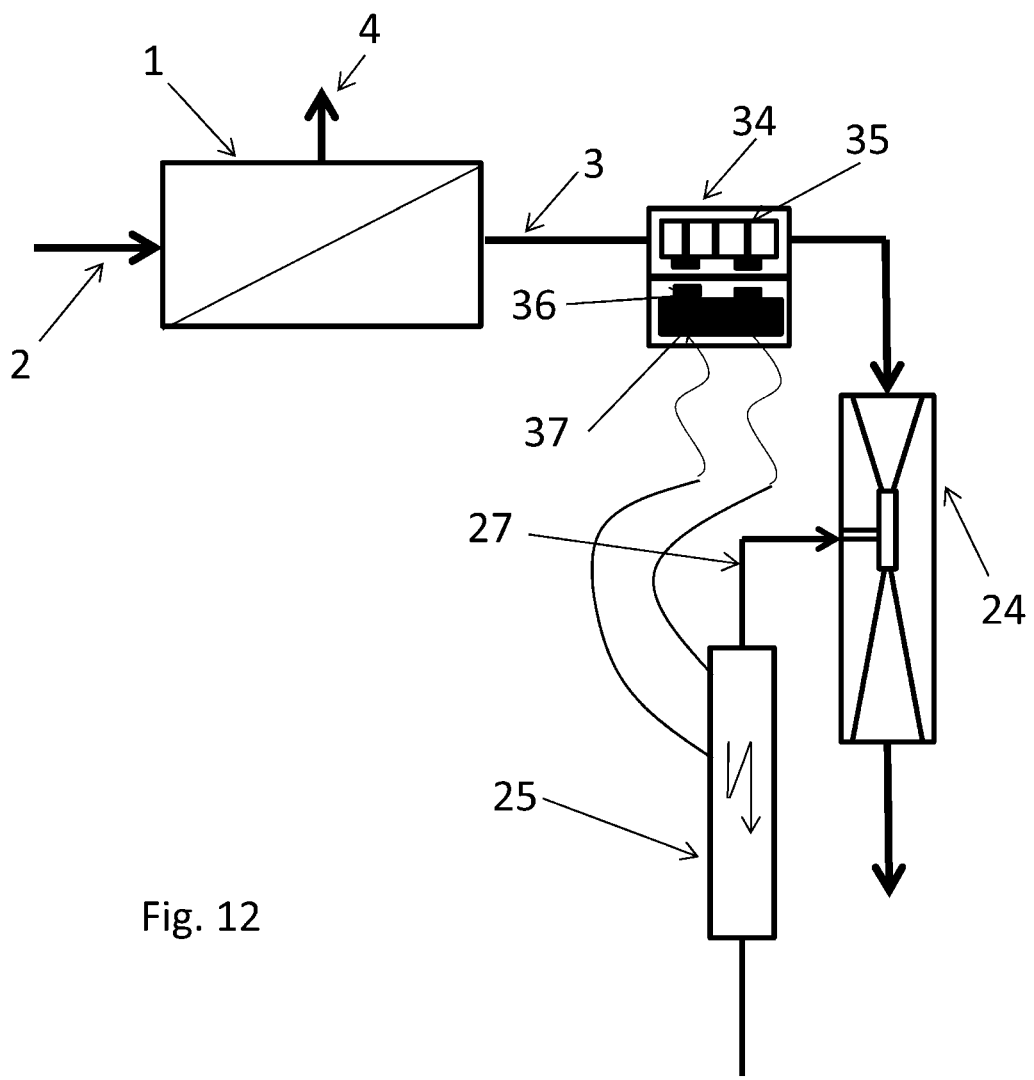
FIG. 12 schematically shows an example of an arrangement in which the power generator is arranged in the permeate of the reverse osmosis.

FIG. 12 shows an arrangement in which the power generator 34 is arranged in the permeate of the reverse osmosis. The enthalpy of the permeate drives the power generator 34 produces the ozone charge.

Integration of a power generator in the permeate line, the concentrate line or in the feed line is advantageous since the turbine only starts up and consequently produces power when the reverse osmosis device supplies demineralized water (permeate). The ozone production consequently starts automatically with the operation of the reverse osmosis, without a further measured variable such as pressure or through-flow.

The invention claimed is:

1. A dishwasher comprising a device that provides water having an oxidizing and disinfecting action, comprising:
    a) a reverse osmosis device in which a stream of untreated water is separated into a concentrate stream and a permeate stream,
    b) a line for the permeate stream, and c) an ozone generator for production of ozone, wherein the ozone generator is arranged within the line or coupled to the line such that, when the ozone generator is in operation, the ozone can be introduced into the permeate stream, and the ozone from the ozone generator is introduced into the permeate stream, either by an injector driven by the flow of the permeate stream or by a pumping device.

2. The dishwasher as claimed in claim 1, wherein the device that provides water with an oxidizing and disinfecting action comprises:
- a power generator driven by flow of the stream of untreated water and/or the permeate stream and/or the concentrate stream, or
- a suction device driven by the flow of the permeate stream, or
- a pumping device operated with energy obtained during operation of the reverse osmosis device.

3. The dishwasher as claimed in claim 1, further comprising:
- an ion exchange membrane arranged between the anode and the cathode of the electrolytic ozone generator by which the electrolytic cell is subdivided into an anode region with the anode and a cathode region with the cathode, wherein the electrolytic ozone generator is integrated in the line for the permeate stream and comprises an electrolytic cell with an anode and a cathode, between which a voltage that is sufficiently high for ozone to form at the anode can be applied.

4. The dishwasher as claimed in claim 3, wherein the ion exchange membrane arranged in the electrolytic cell has apertures through which permeate can pass from the cathode region into the anode region and vice versa.

5. The dishwasher as claimed in claim 3, wherein the ion exchanger membrane treats the permeate stream to remove hardness before the ozone is introduced into the permeate stream.

6. The dishwasher as claimed in claim 3, wherein the electrolytic cell has an inflow for permeate into the anode region and connects to the line for the permeate stream, and also an outflow out of the cathode region and can be used to discharge the ozonized permeate from the electrolytic cell.

7. The dishwasher as claimed in claim 3, wherein the electrolytic cell has an inflow for permeate into the cathode region and connects to the line for the permeate stream, and also an outflow out of the anode region and can be used to discharge the ozonized permeate from the electrolytic cell.

* * * * *